US005472755A

United States Patent [19]

Nibling, Jr.

[11] Patent Number: 5,472,755

[45] Date of Patent: Dec. 5, 1995

[54] SPLICE

[75] Inventor: Gene L. Nibling, Jr., Ludlow Falls, Ohio

[73] Assignee: Brown-Bridge Industries, Troy, Ohio

[21] Appl. No.: 148,766

[22] Filed: Nov. 4, 1993

[51] Int. Cl.[6] .......... B31F 5/06; B32B 3/02; B65H 21/00

[52] U.S. Cl. .......... 428/40; 156/157; 156/304.3; 156/289; 428/61

[58] Field of Search .......... 156/157, 304.3, 156/247, 249, 289, 159; 428/58, 61, 40, 41, 42, 57, 60

[56] References Cited

U.S. PATENT DOCUMENTS

| | | | |
|---|---|---|---|
| 3,135,642 | 6/1964 | Ruffer | 428/61 |
| 3,573,146 | 3/1971 | Guinan et al. | 428/61 |
| 4,009,065 | 2/1977 | Mikulas | 428/61 |
| 4,257,837 | 3/1981 | Lucas | 156/304.3 |
| 5,320,698 | 6/1994 | Fournier et al. | 428/61 |

FOREIGN PATENT DOCUMENTS

| | | | |
|---|---|---|---|
| 2714854 | 10/1978 | Germany | 156/157 |

*Primary Examiner*—Steven D. Maki
*Attorney, Agent, or Firm*—Killworth, Gottman, Hagan & Schaeff

[57] ABSTRACT

A splice structure for joining abutting ends of a multi-ply pressure sensitive label stock. The structure is composed of (1) two abutting ends of separate indeterminate lengths of multi-ply pressure sensitive label stock such that the abutting ends define a butt joint along the width of the label stock having a top which corresponds to a first face of the label stock and a bottom which corresponds to a second face of the label stock; (2) a first adhesive support tape spanning the width of the label stock to adhesively join abutting ends of the first face of the label stock and cover the top of the butt joint; (3) a second adhesive support tape spanning the width of the label stock to adhesively join abutting ends of the second face of the label stock and cover the bottom of the butt joint; and (4) a release coating applied at the butt joint which detackifies only the portion of the adhesive support tapes that cover the butt joint to keep the adhesive support tapes from bonding through the butt joint while not adding to the thickness of the splice structure. Also disclosed is a method of splicing sheet material utilizing an improved splice structure.

10 Claims, 1 Drawing Sheet

SPLICE

FIELD OF THE INVENTION

The field of the present invention is directed toward splices for joining sheet materials.

BACKGROUND OF THE INVENTION

Manufacturing processes that involve materials such as paper, film, foil, fabrics or the like often feed the material into the process from storage on reels, spools, rolls or the like. Reels, spools or rolls need to be changed when they run out of material. In order to keep manufacturing processes using such feed systems operating smoothly, splices are used to connect rolls of material to minimize interruption of continuous manufacturing processes. Eliminating interruptions can be especially important in certain high-speed manufacturing processes such as, for example, printing, converting and packaging processes.

One problem with conventional splices used to join flat sheet-type materials is that the splice construction adds to the thickness of the sheet. Multi-ply materials such as label stock present particular splice problems. Generally speaking, multi-ply materials are spliced utilizing an adhesive support tape to join each ply of the multi-ply material or at least the outer plies. In order to avoid extreme variations in thickness along the length of a sheet, multi-ply materials are often spliced by arranging abutting ends to form a butt joint. If the adhesive support tapes join and bond through the butt joint, the splice itself or even the entire web could break when one ply of the multi-ply pressure sensitive label stock is removed.

Conventional splices for multi-ply materials are often constructed so that a piece of film or tape is placed between the plies to cover the butt joint. This cover tape effectively prevents such bonding of the adhesive support tapes. However, the additional layer of material may reduce the processability of the multi-ply material because of the variation in thickness. For example, printability of multi-ply label stock can be reduced. The variation in thickness may also cause multi-ply label stock to lose its registration with the printer.

Thus, there is still a need for an improved splice structure for joining abutting ends of a multi-ply pressure sensitive label stock. More particularly, there is still a need for a thinner splice structure for joining abutting ends of a multi-ply pressure sensitive label stock. Even more particularly, there is still a need for a two-piece splice structure for joining abutting ends of a multi-ply pressure sensitive label stock.

OBJECTS OF THE INVENTION

Accordingly, it is a general object of the present invention to provide an improved splice structure for joining abutting ends of a multi-ply pressure sensitive label stock.

Another object of the present invention is to provide a thinner splice structure for joining abutting ends of a multi-ply pressure sensitive label stock.

It is also an object of the present invention to provide a two-piece splice structure for joining abutting ends of a multi-ply pressure sensitive label stock.

Still further objects and the broad scope of applicability of the present invention will become apparent to those of skill in the art from the details given hereinafter. However, it should be understood that the detailed description of the presently preferred embodiment given herein of the present invention is given only by way of illustration because various changes and modifications well within the spirit and scope of the invention will become apparent to those of skill in the art in view of the detailed description.

DEFINITIONS

As used herein, the term "outer surface" refers to the face of a layer or ply of a multi-ply material which is oriented toward or actually composes the exterior portion of the multi-ply material.

As used herein, the term "inner surface" refers to a layer or ply which is not an outer surface.

As used herein, the term "multi-ply pressure sensitive label stock" refers to a multiple layer or ply structure composed of at least one array of (1) a release base having an outer surface and an inner surface, (2) a release coating on the inner surface of the release base, (3) a layer of a pressure sensitive adhesive adjacent the coating on the inner surface of the release base, (4) a carrier material layer adjacent the pressure sensitive adhesive layers. The combined release base and release coating are often referred to as the "liner" and the combined carrier material layer and pressure sensitive adhesive layer are often referred to as the "face sheet".

As used herein, the term "roll" refers to an arrangement or configuration of a material or materials in a rolled form including, but not limited to, reels, spools, spindles, bobbins, wheels, cylinders and balls.

As used herein, the term "butt joint" refers to an interstice created when one end of a sheet material is joined in abutting relationship with another end the same or separate length of sheet material. The abutting ends define an interstice or joint along the width of the two aligned ends of sheet material. Generally speaking, a butt joint has an open top which corresponds to a first face of the sheet materials and an open bottom which corresponds to a second face of the sheet materials.

As used herein, the term "adhesion strength" refers to the relative level of bonding between two substances by surface attachment provided by an adherent. Unless otherwise specified herein, adhesion strength is measured generally in accordance with ASTM D 3330-90 (Test Method A— Single Coated Tapes) utilizing a 90 degree or "L" peel test on stainless steel. Each test sample is composed of a pressure sensitive adhesive coated tape. The adhesive surfaces are covered by a release liner. Samples are approximately 1 in.×5 in. One release liner is removed, and the exposed adhesive is laminated to a stainless steel panel utilizing a 4.5 lb. roller, rolled at 12 in./min. twice along the length of the test strip. Each sample has a dwell time of 10 minutes. One end of the test strip is put into the top jaw of an Instron Model 1132 Universal Test Instrument. The strip is pulled away from the panel at a 90 degree angle. The rate at which the Instron jaw traveled away from the panel is 12 inches per minute. The stainless steel panels are washed with toluene and rinsed with acetone between tests. The results of testing (i.e., the adhesion strength) are reported in units of force per unit of width. For example, the adhesion strength can be reported in units of $grams_{force}$/centimeter or $ounces_{force}$/inch.

SUMMARY OF THE INVENTION

The present invention addresses the needs discussed above by providing a splice structure for joining abutting ends of a multi-ply pressure sensitive label stock. In such abutting configuration, the ends of label stock define a butt joint along the width of the label stock. The butt joint has a top which corresponds to a first face of the label stock and a bottom which corresponds to a second face of the label stock.

In order to join the abutting ends with minimal increase in thickness of the label stock at the splice, the splice structure of the present invention is composed of (1) two abutting ends of separate indeterminate lengths of multi-ply pressure sensitive label stock, the abutting ends defining a butt joint; (2) a first adhesive support tape spanning the width of the label stock to adhesively join abutting ends of the first face of the label stock and cover the top of the butt joint; (3) a second adhesive support tape spanning the width of the label stock to adhesively join abutting ends of the second face of the label stock and cover the bottom of the butt joint; and (4) a release coating applied at the butt joint which detackifies only the portion of the adhesive support tapes that covers the butt joint to keep the adhesive support tapes from bonding through the butt joint while not adding to the thickness of the splice structure.

Generally speaking, when used with conventional label stock material, the butt joint delineates a gap ranging from about 0.2 to about 1.5 millimeters (about 0.008 to about 0.06 inch). For example, the butt joint may delineate a gap ranging from about 0.4 to about 0.8 millimeter (about 0.016 to about 0.03 inch).

In one aspect of the present invention, the splice structure adds less than about 0.1 millimeter (about 0.004 inch) to the thickness of the multi-ply label stock at the splice. For example, the splice structure adds less than about 0.08 millimeter (about 0.003 inch) to the thickness of the multi-ply label stock at the splice. Desirably, the splice structure is from about 20 to about 50 percent thinner than a conventional three-part splice structure used with multi-ply label stock when measured at the splice. Even more desirably, the splice structure is from about 30 to about 40 percent thinner than a conventional three-part splice structure used with multi-ply label stock when measured at the splice.

According to the present invention, the adhesive support tape is composed of a pressure-sensitive adhesive coated sheet wherein the sheet is selected from kraft papers, supercalendered kraft papers, clay-coated kraft papers, polyolefin coated kraft papers, glassines, parchments and films. The films may be selected from one or more of polyolefin films, polystyrene films and polyester films. In one aspect of the invention, the pressure sensitive adhesive component of the adhesive support tape may be selected from one or more of acrylic adhesives, poly(ethylene-vinyl acetate) maleate adhesives, synthetic rubber based and natural rubber based adhesives.

Generally speaking, the adhesion of the adhesive support tape is from about 1.5 to about 10 times greater than the adhesion between the plies of the multi-ply label stock. For example, the adhesion of the adhesive support tape may be from about 2 to about 5 times greater than the adhesion between the plies of the multi-ply label stock.

According to the invention, the release coating which is applied at the butt joint can be any suitable material commonly used for that purpose. Exemplary release coatings include waxes, wax emulsions, latex emulsions, silicones, modified silicones, fluorocarbons, polyethylenes, Werner-type chrome complexes, and polyvinyl octadecylcarbamate. Desirably, the release coating is selected from waxes and wax emulsions.

In one aspect of the present invention there is provided a two-piece splice structure adapted to join abutting ends of a two-ply pressure sensitive label stock. The structure is composed of (1) two abutting ends of separate indeterminate lengths of two-ply pressure sensitive label stock such that the abutting ends define a butt joint along the width of the label stock having a top which corresponds to a first face of the label stock and a bottom which corresponds to a second face of the label stock; (2) a first adhesive support tape spanning the width of the label stock to adhesively join abutting ends of the first face of the label stock and cover the top of the butt joint; (3) a second adhesive support tape spanning the width of the label stock to adhesively join abutting ends of the second face of the label stock and cover the bottom of the butt joint; and (4) a release coating applied at the butt joint which detackifies only the portion of the adhesive support tapes that cover the butt joint to keep the adhesive support tapes from bonding through the butt joint while not adding to the thickness of the splice structure.

The present invention also encompasses a method of joining abutting ends of a multi-ply pressure sensitive label stock by utilizing an improved splice structure. The method includes the steps of (1) aligning two ends of separate lengths of multi-ply pressure sensitive label stock in abutting relationship, the abutting ends defining a butt joint along the width of the label stock having a top which corresponds to a first face of the label stock and a bottom which corresponds to a second face of the label stock; (2) applying a second adhesive support tape to span the width of the label stock thereby adhesively joining abutting ends of second face of the label stock and covering the bottom of the butt joint; (3) applying a release coating to the butt joint, the release coating being adapted to detackify only the portion of the adhesive support tapes covering the butt joint; and (4) applying a first adhesive support tape to span the width of the label stock thereby adhesively joining abutting ends of second face of the label stock and covering the top of the butt joint, so that the release coating keeps the adhesive support tapes from bonding through the butt joint while not adding to the thickness of the splice structure.

DETAILED DESCRIPTION OF THE INVENTION

Figure 1:
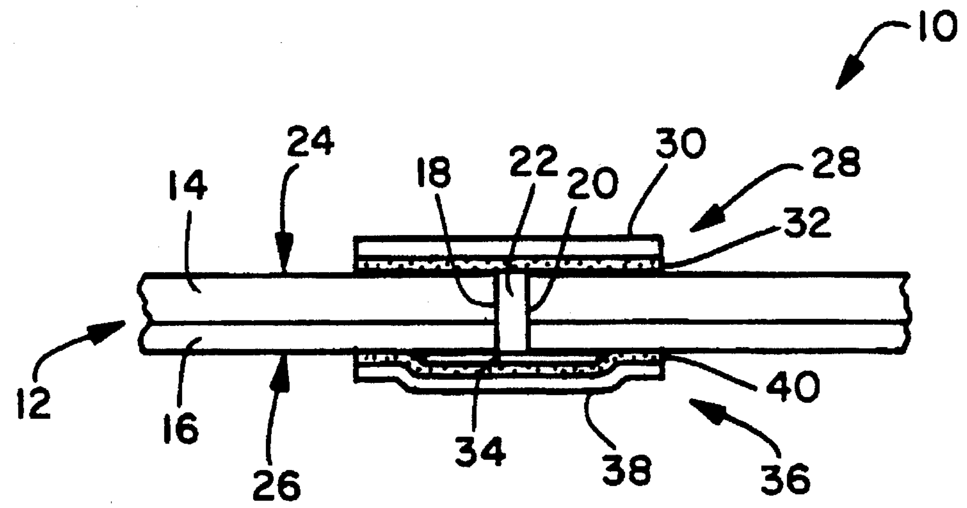
FIG. 1 PRIOR ART
FIG. 1 is an illustration of an exemplary three-piece splice structure for joining abutting ends of a multi-ply pressure sensitive label stock.

Referring to FIG. 1 of the drawings there is illustrated (not necessarily to scale) at 10 a conventional three-piece splice structure for joining abutting ends of a multi-ply pressure sensitive label stock. Generally speaking, the conventional splice structure 10 is composed of a conventional multi-ply pressure sensitive label stock 12 which is constructed of a carrier layer or ply 14, a release backing 16 and a pressure sensitive adhesive coatings (not shown) between the carrier layer 14 and release backing 16. An end 18 of the label stock 12 is aligned in abutting relationship with another end 20 of a separate indeterminate length of multi-ply pressure sensitive label stock 12. The abutting ends define a butt joint 22 along the width of the label stock 12. The butt joint 22 has a top which corresponds to a first face 24 of the label stock 12 and a bottom which corresponds to a second face 26 of the label stock 12.

A first adhesive support tape 28 spans the width of the label stock to adhesively join abutting ends 18 and 20 of the first face 24 of the label stock 12. In doing so, the adhesive support tape covers the top of the butt joint 22. Generally speaking, the adhesive support tape 28 is a pressure-sensitive adhesive material composed of a carrier sheet 30 and a pressure-sensitive adhesive 32.

In the conventional three-piece splice structure 10, a cover tape 34 is used to span the length of the butt joint 22 and shield the bottom of the butt joint.

A second adhesive support tape 36 superposes the cover tape 34 and spans the width of the label stock 12 to adhesively join abutting ends 18 and 20 of the second face 26 of the label stock 12. The cover material 34 at the butt joint 22 prevents adhesive from the adhesive support tapes from bonding together through the joint. Generally speaking, the adhesive support tape 36 is a pressure-sensitive adhesive material composed of a carrier sheet 38 and a pressure-sensitive adhesive 40.

If the adhesive support tapes join and bond through the joint, the splice itself or even the entire web could break when one ply (i.e., layer) of the multi-ply pressure sensitive label stock is removed. The cover tape 34 effectively prevents such bonding of the adhesive support tapes. However, the additional layer of material may reduce the printability of the label stock and may cause label stock to lose its registration with the printer.

Figure 2:
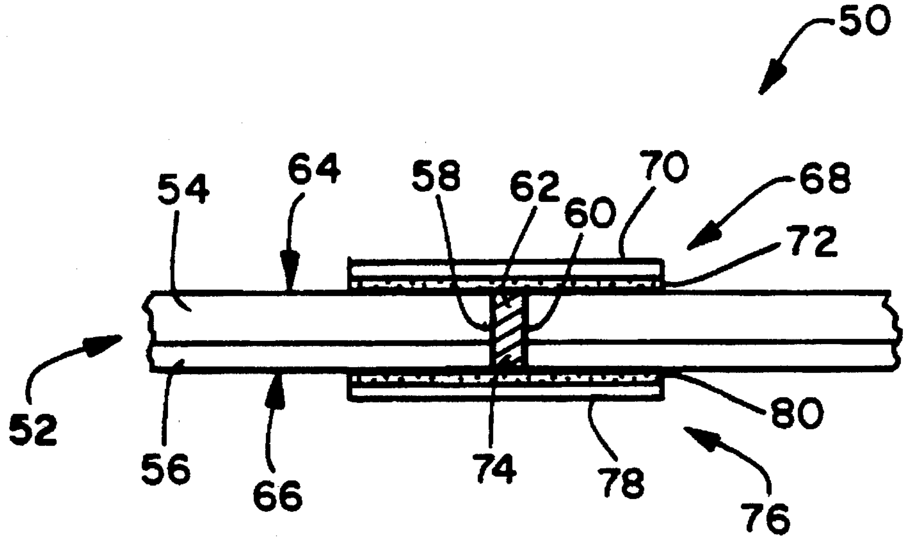
FIG. 2 is an illustration of an exemplary two-piece splice structure for joining abutting ends of a multi-ply pressure sensitive label stock.

Referring now to FIG. 2 of the drawings there is illustrated (not necessarily to scale) at 50 an exemplary splice structure of the present invention. The splice structure is used to join abutting ends of a multi-ply pressure sensitive label stock. Generally speaking, the splice structure 50 is composed of a conventional multi-ply pressure sensitive label stock 52 which is constructed of a carrier layer or ply 54, a release backing 56 and a pressure sensitive adhesive coatings (not shown) between the carrier layer 54 and release backing 56. An end 58 of the label stock 52 is aligned in abutting relationship with another end 60 of a separate indeterminate length of multi-ply pressure sensitive label stock 52. The abutting ends define a butt joint 62 along the width of the label stock 52. The butt joint 62 has a top which corresponds to a first face 64 of the label stock 52 and a bottom which corresponds to a second face 66 of the label stock 52.

A first adhesive support tape 68 spans the width of the label stock to adhesively join abutting ends 58 and 60 of the first face 64 of the label stock 52. In doing so, the adhesive support tape covers the top of the butt joint 62. Generally speaking, the adhesive support tape 68 is a pressure-sensitive adhesive material composed of a carrier sheet 70 and a pressure-sensitive adhesive 72.

A release coating 74 is applied at the butt joint to detackify, seal or otherwise separate only the portion of the adhesive support tapes that cover the butt joint to keep the first adhesive support tape 68 from bonding through the butt joint with a second adhesive support tape 76 which spans the width of the label stock 52 to adhesively join abutting ends 58 and 60 of the second face 56 of the label stock 52. Generally speaking, the adhesive support tape 76 is a pressure-sensitive adhesive material composed of a carrier sheet 78 and a pressure-sensitive adhesive 80.

If the adhesive support tapes join and bond through the joint, the splice itself or even the entire web could break when one ply (i.e., layer) of the multi-ply pressure sensitive label stock is removed. The cover tape 34 effectively prevents such bonding of the adhesive support tapes. Importantly, the release coating is able to prevent bonding of the adhesive support tapes without adding to the thickness of the splice. Variations in thickness found in conventional three-piece splices may reduce the printability of the label stock and may cause label stock to lose its registration with the printer.

Referring now to FIGS. 1 and 2, the carrier sheets 30 may be any suitable material generally used for carrier sheets. Exemplary carrier sheets may be selected from kraft papers, super-calendered kraft papers, clay-coated kraft papers, polyolefin coated kraft papers, glassines, parchments and films. If the carrier sheet 30 is a film, the film may be one or more polyolefin films, polystyrene films and polyester films.

The pressure sensitive adhesive component of the multi-ply pressure sensitive label stock and the adhesive support tape can be made from any suitable pressure sensitive adhesive. Exemplary adhesive materials include, but are not limited to, acrylic adhesives, tackified acrylic adhesives, natural rubber-based adhesives, synthetic rubber-based adhesives, and multipolymers containing poly(ethylene-vinyl acetate) maleate. In some cases, it may be desirable for the adhesive to have dispersibility characteristics which make it compatible with paper repulp systems.

Generally speaking, the adhesive is selected so that the adhesive support tape exhibits an adhesion strength which is less than the adhesion between the plies (i.e., layers) of the multi-ply label stock. Generally speaking, the adhesion of the adhesive support tape is from about 1.5 to about 10 times greater than the adhesion between the plies of the multi-ply label stock. For example, the adhesion of the adhesive support tape is from about 2 to about 5 times greater than the adhesion between the plies of the multi-ply label stock. The relative adhesion strengths are desirably based on a comparison of adhesion strengths determined generally in accordance with ASTM D 3330-90 (Test Method A—Single Coated Tapes) utilizing a 90 degree or "L" peel test on stainless steel.

The release coating used in the multi-ply pressure sensitive label stock and at the butt joint can be any suitable material commonly used as a release coating. Exemplary release coatings include waxes, wax emulsions, latex emulsions, silicones, modified silicones, fluorocarbons, polyethylenes, Werner-type chrome complexes, and polyvinyl octadecylcarbamate. Desirably, the release coating used in the multi-ply pressure sensitive adhesive label stock is a silicone-type material. It is also desirable that the release coating utilized at the butt joint is a wax or wax emulsion type material. It is contemplated that varnishes and similar materials which block the passage of adhesive from the adhesive support tapes through the butt joint may also be used. The release coating may be applied to the butt joint by any method known in the art. Useful methods include direct coating (i.e., the application of the adhesive directly to the butt joint), transfer coating, brush application, spray application, and similar techniques. Automatic and/or manual techniques of applying the release coating to the butt joint are contemplated in the practice of the present invention.

EXAMPLE

Two ends of a multi-ply pressure sensitive label stock available from Brown-Bridge of Troy, Ohio under the trade designation 60 Lb. High Gloss/B-82 Adhesive/40 Lb.

Release Coated Liner were each cut to form clean matching edges. This label stock was composed of a release base having a silicone release coating (the combination being referred to as the "liner") and carrier material layer having a pressure sensitive adhesive layer (the combination being referred to as the "face sheet").

The matching edges of the two ends of label stock were aligned in abutting relationship to form a butt joint. The face sheet was on top and the liner sheet was on the bottom. A strip of #850 Polyester Tape available from Minnesota Mining & Manufacturing Company (3M) was applied to the bottom of the butt joint (i.e., to the liner sheet) so the adhesive side of the tape was facing up to adhesively join the two ends of the label stock together.

The two pieces of face sheet on either side of the butt joint were peeled back or separated from the liner sheet on the side of the label stock where tape was not yet applied. A small brush was used to apply a wax polish (Red shoe polish available from the Kiwi Polish Company, Pottstown, Pa.) directly onto the butt joint formed by the abutting ends of the liner sheet.

The two pieces of face sheet were smoothed back down onto the liner sheet. A strip of #850 Polyester Tape was applied to the top of the butt joint (i.e., to the face sheet) so the adhesive side of the tape was facing down to adhesively join the two ends of the label stock together.

The resulting splice allowed the face sheet to be continuously separated from the liner by preventing bonding of the adhesive tape through the butt joint. The thickness of the label stock at the splice (including both strips of #850 Polyester Tape) was approximately 0.011 inches (0.275 millimeter). The thickness was measured utilizing an Exact Automatic Micrometer available from E. J. Cady & Company, Chicago, Ill.

A conventional three-part splice was constructed on identical label stock material utilizing #850 Polyester Tape join the face sheet and liner together. The conventional three-part splice employed a strip of 3M 610 High Tack Cellophane Clear Tape available from Minnesota Mining and Manufacturing Company (3M) between the face sheet and the liner to prevent bonding of the adhesive tape through the butt joint. The thickness of the label stock at the conventional three-part splice (including both strips of #850 Polyester Tape and the strip of 3M 610 Tape) was approximately 0.0145 inches (0.3625 millimeter) as measured utilizing the Exact Automatic Micrometer.

As can be seen from the example, the thickness of the improved splice is approximately 24 percent less than the thickness of the conventional three-part splice.

It should be understood that the detailed description and specific examples which indicate the presently preferred embodiments of the invention are given by way of illustration only since various changes and modifications within the spirit and scope of the appended claims will become apparent to those of ordinary skill in the art upon review of the above detailed description.

What is claimed is:

1. A splice structure joining abutting ends of a multi-ply pressure sensitive label stock, the structure comprising:

two lengths of multi-ply pressure sensitive label stock, said multi-ply pressure-sensitive label stock comprising a carrier layer, a release backing and a pressure-sensitive adhesive coating between said carrier layer and said release backing, said two lengths having abutting ends defining a butt joint having a top and bottom, each length of label stock having a first face and each length of label stock having a second face;

a first adhesive support tape adhesively joined to the first face of one of said two lengths of said label stock and adhesively joined to the first face of the other of said two lengths of label stock, said first adhesive support tape covering the top of the butt joint;

a second adhesive support tape adhesively joined to the second face of one of said two lengths of said label stock and adhesively joined to the second face of the other of said two lengths of label stock, said second adhesive support tape covering the bottom of the butt joint; and a release coating applied at the butt joint which contacts only the portion of the adhesive support tapes covering the butt joint and which keeps the adhesive support tapes from adhesively bonding through the butt joint while not adding to the thickness of the splice structure;

wherein the butt joint delinates a gap and the gap is filled with the release coating so that the release coating contacts the first adhesive support tape and the second adhesive support tape.

2. The structure according to claim 1, wherein the butt joint delineates a gap ranging from about 0.2 to about 1.5 millimeters.

3. The structure according to claim 2, wherein the butt joint delineates a gap ranging from about 0.4 to about 0.8 millimeters.

4. The structure according to claim 1, wherein the release coating is selected from the group consisting of waxes, wax emulsions, latex emulsions, silicones, modified silicones, fluorocarbons, polyethylenes, and polyvinyl octadecylcarbamate.

5. The structure according to claim 1, wherein each adhesive support tape comprises a pressure-sensitive adhesive coated sheet wherein the sheet is selected from the group consisting of kraft papers, super-calendered kraft papers, clay-coated kraft papers, polyolefin coated kraft papers, glassines, parchments, polyolefin films, polystyrene films and polyester films.

6. The structure according to claim 5, wherein the pressure sensitive adhesive of said pressure-sensitive adhesive coated sheet is selected from the group consisting of acrylic adhesives, poly(ethylene-vinyl acetate) maleate adhesives, synthetic rubber based and natural rubber based adhesives.

7. A method of joining abutting ends of a multi-ply pressure sensitive label stock to form a splice structure, the method comprising the steps of:

aligning the ends of two lengths of multi-ply pressure sensitive label stock in abutting relationship, said multi-ply pressure sensitive label stock comprising a carrier layer, a release backing, and a pressure sensitive adhesive between said carrier layer and said release backing, the abutting ends defining a butt joint having a top and bottom, each length of label stock having a first face and each length of label stock having a second face;

adhesively joining a second adhesive support tape to the second face of one of said two lengths of said label stock and to the second face of the other of said two lengths of label stock, said second adhesive support tape covering the bottom of the butt joint;

applying a release coating to the butt joint, the release coating being in contact with only the portion of the second adhesive support tape covering the butt joint, adhesively joining a first adhesive support tape to the first face of one of said two lengths of said label stock and to the first face of the other of said two lengths of label stock, said first adhesive support tape covering the top of the butt joint;

wherein the release coating keeps the adhesive support tapes from adhesively bonding through the butt joint while not adding to the thickness of the splice structure and wherein the butt joint delinates a gap and the gap is filled with the release coating so that the release coating contacts the first adhesive support tape and the second adhesive support tape.

8. The method according to claim 7, wherein the butt joint delineates a gap ranging from about 0.2 to about 1.5 millimeters.

9. The method according to claim 7, wherein the release coating is selected from the group consisting of waxes, wax emulsions, latex emulsions, silicones, modified silicones, fluorocarbons, polyethylenes and polyvinyl octadecylcarbamate.

10. The method according to claim 7 wherein each adhesive support tape comprises a pressure-sensitive adhesive coated sheet wherein the sheet is selected from the group consisting of kraft papers, super-calendered kraft papers, clay-coated kraft papers, polyolefin coated kraft papers, glassines, parchments, polyolefin films, polystyrene films and polyester films.

* * * * *